U. A. WEBLEY.
COMBINED SLED AND GO-CART.
APPLICATION FILED FEB. 12, 1915.
1,233,735.
Patented July 17, 1917.
2 SHEETS—SHEET 2.
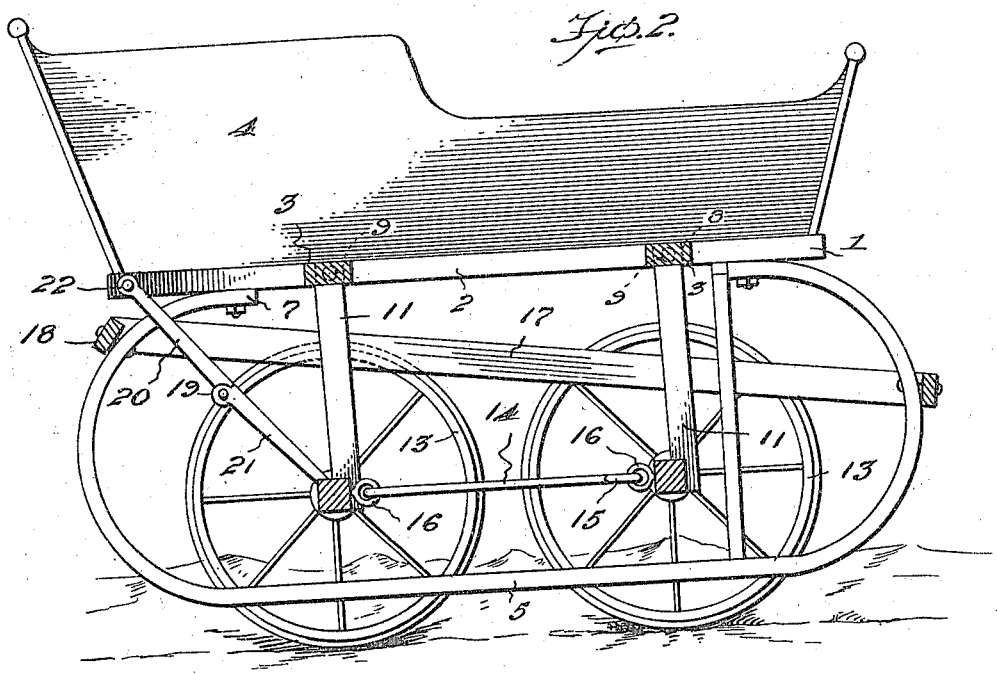
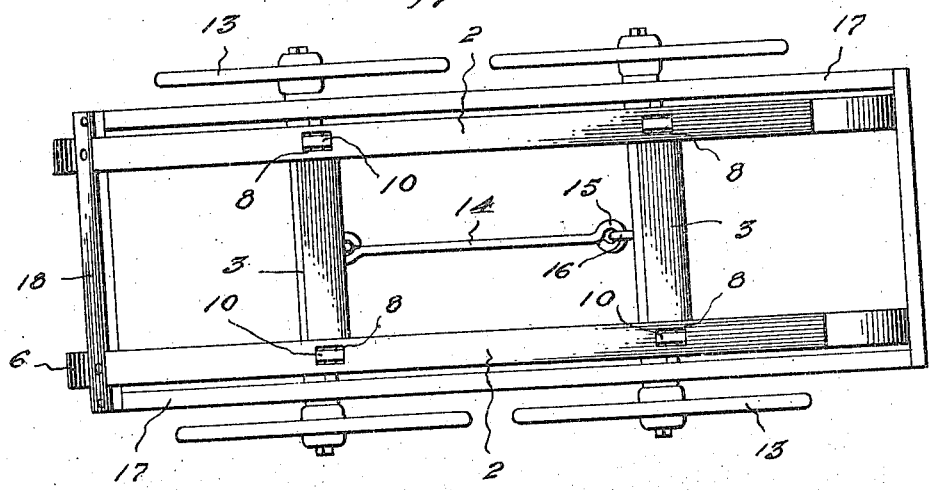

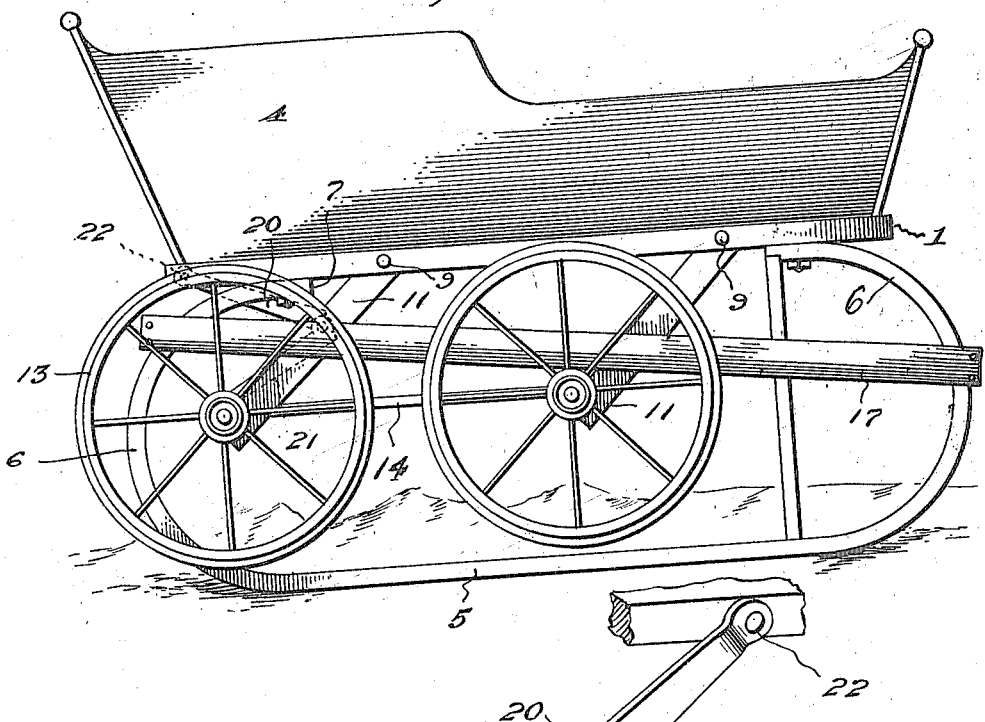
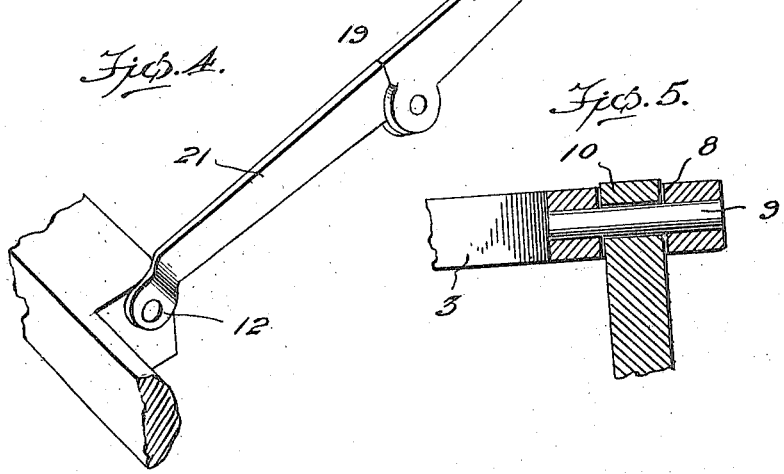
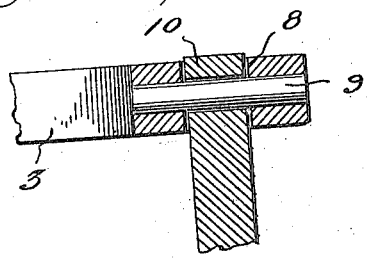

UNITED STATES PATENT OFFICE.

UPTON A. WEBLEY, OF ELKINS, WEST VIRGINIA.

COMBINED SLED AND GO-CART.

1,233,735.  Specification of Letters Patent.  Patented July 17, 1917.

Application filed February 12, 1915. Serial No. 7,718.

*To all whom it may concern:*

Be it known that I, UPTON A. WEBLEY, a citizen of the United States, residing at Elkins, in the county of Randolph and State of West Virginia, have invented certain new and useful Improvements in Combined Sleds and Go-Carts; and I do hereby declare the following to be a full, clear, and exact description of the invention, such as will enable others skilled in the art to which it appertains to make and use the same.

The invention relates to improvements in combined sleds and go-carts.

The object of the present invention is to improve the construction of combined sleds and go-carts and to provide a simple, practical and cheap device capable of being readily operated to be converted into either a sled or a go-cart to adapt it for use in sections of the country where the climate is changeable and snow after it falls disappears frequently with great rapidity.

It is also the object of the invention to provide a combined sled and go-cart having the said features and costing little more than an ordinary go-cart or baby carriage sled.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawings

Figure 1 is a side elevation of a combined sled and go-cart constructed in accordance with this invention and arranged to form a sled, Fig. 2 is a longitudinal sectional view of the same, the parts being arranged to form a go-cart, Fig. 3 is a reverse plan view of the combined sled and go-cart, Fig. 4 is a detail perspective view of the locking brace for holding the wheels in their operative position, Fig. 5 is a detail sectional view illustrating the manner of pivoting the supporting arm.

Like numerals of reference designate corresponding parts in all the figures of the drawings.

In the accompanying drawings in which is illustrated the preferred embodiment of the invention, 1 designates a supporting frame comprising side bars 2 and transverse connecting bars 3 supporting a baby carriage body 4 which may be of any preferred construction and style. The combined sled and go-cart is equipped with a pair of runners 5 provided with upwardly extending curved terminal portions 6 which are secured at their upper ends 7 to the lower faces of the side bars of the supporting frame by bolts or other suitable fastening devices. The runners are rigid with the supporting frame and are adapted to support the same and the body to form a sled.

The side bars 2 of the supporting frame are provided at spaced points with openings 8 in which are pivoted by transverse pins 9 upper terminals 10 of supporting arms 11 located between the upwardly extending terminal portions of the runners and arranged in the vertical plane of the same. By this arrangement the runners are adapted to cut a path for the arms 11 which do not thereby come in contact with snow drifts or other obstructions.

The arms 11 which oscillate longitudinally of the combined sled and go-cart carry at their lower ends transverse axles 12 upon which are mounted wheels 13. The arms 11 may be of any desired length and may move through an arc any desired distance to raise the wheels to the proper elevation when it is desired to lower the runners to form a sled. The runners are connected by a central longitudinally disposed rod 14 provided at its ends with hooks or eyes 15 which are linked into eyes 16 of the axles. The rod 14 connects the axles and maintains the same in proper spaced relation and causes a simultaneous oscillation of both pairs of arms 11 when either pair is actuated. Inclined bars 17 are arranged at the outer edges of the runners and are respectively connected by transverse end bars 18, which are secured by bolts or other suitable fastening devices to the upwardly extending terminal portions of the runners, and serve to brace the respective terminals of the runners. The runners are also braced and supported by the guide bars which form with the transverse bars 18 a rectangular frame. The wheels are maintained in operative position with their lower portions projecting below the runners by means of a locking brace 19 composed of upper and lower sections 20 and 21 and extending downwardly and inwardly from one end of the supporting frame to the adjacent axle when the parts are arranged to form a go-cart as illustrated in Fig. 2 of the drawings.

The upper end 22 of the upper section 20 of the brace 19 is pivoted to the supporting frame and the lower end of the lower section 21 is pivoted at 23 to the axle 12. The brace is adapted to break upwardly and inwardly to prevent the arms 11 swinging upwardly and it also forms a lock for rigidly maintaining the wheels in a projecting position.

What is claimed is:—

A device of the class described including a rectangular frame having side and end bars, a body secured to the upper side of said frame, a runner secured to the under side of each side bar of said frame adjacent each end thereof, a plurality of arms, said arms arranged in pairs and one arm of each pair being pivotally secured to and depending from the under side of each side bar adjacent the ends thereof, said arms being located within the vertical plane of the runners, an axle secured to the lower ends of each pair of arms and the opposite ends of said axles extending beyond the side bars of the frame, wheels journaled on the ends of said axles, a longitudinally extending rod pivotally secured by its ends to each axle centrally thereof, adapted to move the axles and wheels simultaneously in either direction, means surrounding and connected to said runners and located between the arms and side bars of the frame, said means adapted to prevent relative lateral movement of said arms in either direction, and means pivotally connected to said body and one axle for holding the axles and wheels in either raised or lowered position.

In testimony whereof I affix my signature in presence of two witnesses.

UPTON A. WEBLEY.

Witnesses:
J. T. LINGAMFILTER,
ETHELBIRT WEBLEY.

Copies of this patent may be obtained for five cents each, by addressing the "Commissioner of Patents, Washington, D. C."